March 15, 1927.
G. H. WHEATLEY
1,621,388
RUBBER FLAP
Filed Dec. 3, 1923
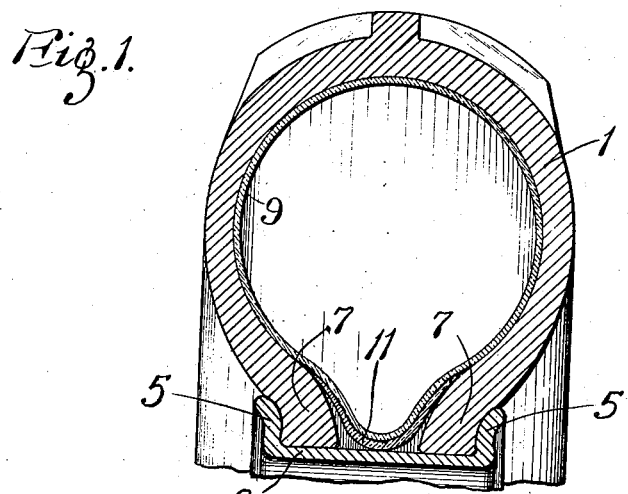
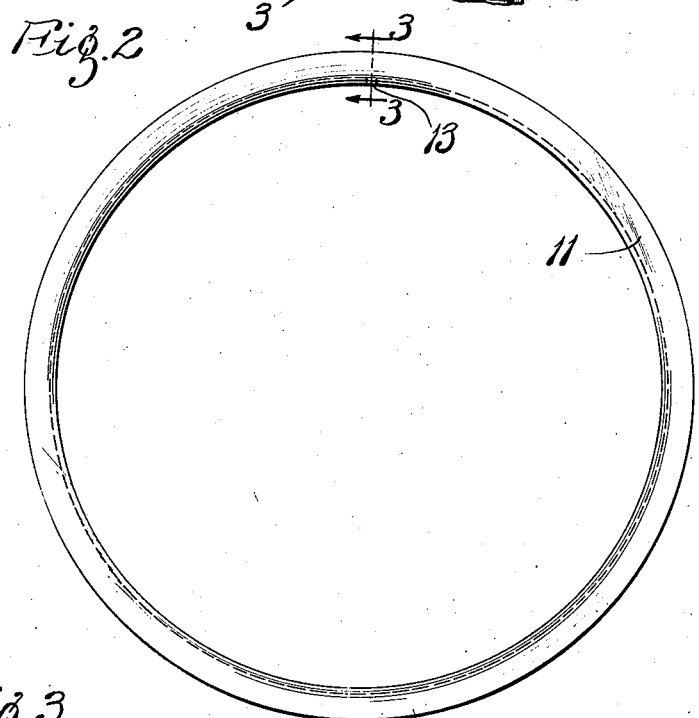
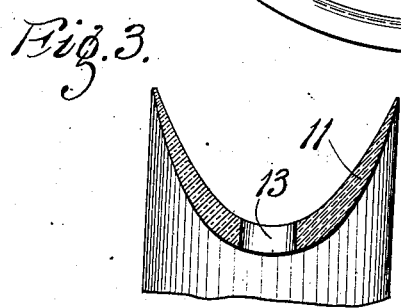
George H. Wheatley
Inventor
Delos G. Haynes
Attorney Patented Mar. 15, 1927.

1,621,388

UNITED STATES PATENT OFFICE.

GEORGE H. WHEATLEY, OF CHICAGO, ILLINOIS.

RUBBER FLAP.

Application filed December 3, 1923. Serial No. 678,135.

This invention relates to pneumatic tires, and more particularly to a flap for use therein.

Among the several objects of the invention may be noted the provision of a simple and inexpensive floating flap adapted to protect the inner tube from the rim and beads; and the provision of a flap so constructed as to minimize depreciation of flap and adjacent parts during severe service conditions. Other objects will be in part obvious and in part pointed out hereinafter.

The invention accordingly comprises the features of construction, combinations of elements, and arrangements of parts, which are exemplified in the constructions hereinafter described and the scope of the application of which will be indicated in the following claims.

In the accompanying drawings, in which is shown one of various possible embodiments of this invention, Fig. 1 is a section through a tire showing the flap of the invention in cross-section in place therein;

Fig. 2 is an elevation of a complete flap prior to installation in the tire ; and Fig. 3 is a section of the flap on the line 3—3 of Fig. 2, showing the valve hole.

Similar reference characters indicate corresponding parts throughout the several views of the drawings.

Referring now more particularly to Fig. 1, there is illustrated at 1 the casing of a pneumatic tire mounted on a rim 3. The sides 5 of the rim engage the base portions 7 of the tire and retain them against spreading apart.

Between the two portions 7 of the base of the tire is placed a flap 11. The flap protects the inner tube from contact with the rim and from any possible pinching by the base portions of the tire, and affords protection to the inner tube 9 against injury by the tools that are used in putting the tire on the rim or taking it off.

The flap is constructed all of rubber or rubber composition; that is, without any fabric.

The flap is less expensive than types ordinarily used heretofore, and is not liable to rot, as is the case with tire flaps constructed partly of fabric or the like.

The flap is preferably made in a tubing machine, and is then lapped at the proper diameter and is pulled over a ring (not shown) and is then vulcanized.

The hole 13 (Fig. 3) is provided for the tire valve.

In operation, the flap "floats" so far as the rim is concerned; that is, it is not secured to the rim; save that the tire valve passing through the flap prevents the flap from creeping.

The contour of the flap (Fig. 3) prior to installation is concave inwardly and is approximately the same as the contour that the flap has after installation. Hence, as indicated in Fig. 1, a resilient fillet is formed for the inner tube at the beads of the casing. The possibility of pinching at the bead is thus avoided, in so far as the flap cannot collapse upon itself or shape itself to pinch the tube as the tube expands.

Furthermore, the fact that the shape of the flap is generally the same after installation as before said installation, prevents undue flexing of the flap such as often causes cracks and folds whereby a tube is pinched.

Another advantage of making the flap form a fillet such as has been indicated is that the fillet provides an air pocket thereunder (Fig. 1) which pocket cushions the flap and tube as its moving load is applied. Chafing and/or sticking the tube and flap is thus reduced.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. An all-rubber, endless and one-piece tire flap having a sectional contour prior to installation, generally the same as the contour after the installation, adapted to protect the inner tube from contact with the rim and from pinching by the tire base, said contour comprising a concave section having an opposite convex side forming a smooth fillet at said tire base but not following the outline of the tire section at said base under conditions of inflation, said flap being relatively thick at the central portion thereof and tapering toward the edges thereof, and adapted to be stretched over the edges of a rim to be inserted between the inner tube and said rim and to extend up on the inner surface of the base portion of said tire.

2. An all-rubber, endless and one-piece tire flap having a sectional contour prior to installation, generally the same as the contour after the installation, said contour comprising a concave surface and a convex surface, the flap being thick at the central portion thereof and tapering at the edges substantially to points, whereby said flap, when in an inflated tire, does not contact with the bead edge of the tire at the rim on which the tire is mounted and whereby a resilient fillet is formed for the tube across the corner between the tire and the rim.

In testimony whereof, I have signed my name to this specification this 27th day of November, 1923.

GEORGE H. WHEATLEY.